(12) United States Patent
Melack et al.

(10) Patent No.: US 9,475,232 B2
(45) Date of Patent: Oct. 25, 2016

(54) DAMPING AND ISOLATING VIBRATION DURING ULTRASONIC WELDING

(71) Applicant: Zee.Aero Inc., Mountain View, CA (US)

(72) Inventors: John Melack, Redwood City, CA (US); Thomas Paul Muniz, Sunnyvale, CA (US); Colin Charles Brey, Redwood City, CA (US)

(73) Assignee: Zee.Aero Inc., Mountain View, CA (US)

( * ) Notice: Subject to any disclaimer, the term of this patent is extended or adjusted under 35 U.S.C. 154(b) by 0 days.

(21) Appl. No.: 14/795,540

(22) Filed: Jul. 9, 2015

(65) Prior Publication Data

US 2016/0151966 A1    Jun. 2, 2016

Related U.S. Application Data

(60) Provisional application No. 62/085,973, filed on Dec. 1, 2014.

(51) Int. Cl.
| | |
|---|---|
| *B29C 65/00* | (2006.01) |
| *B29C 65/08* | (2006.01) |
| *B23K 20/10* | (2006.01) |
| *B29L 31/34* | (2006.01) |
| *B29C 65/78* | (2006.01) |

(52) U.S. Cl.
CPC ............. *B29C 66/87* (2013.01); *B23K 20/10* (2013.01); *B29C 65/08* (2013.01); *B29C 65/7841* (2013.01); *B29C 66/006* (2013.01); *B29C 66/742* (2013.01); *B29K 2995/0091* (2013.01); *B29L 2031/3468* (2013.01)

(58) Field of Classification Search
CPC ............. B29C 65/00; B29C 65/08–65/088; B29C 66/00; B29C 66/87; B29C 35/0261; B29C 35/00; B29C 65/645
See application file for complete search history.

(56) References Cited

U.S. PATENT DOCUMENTS

| | | | | |
|---|---|---|---|---|
| 5,421,923 | A * | 6/1995 | Clarke | .............. B06B 3/00 156/292 |
| 5,958,556 | A * | 9/1999 | McCutcheon | ....... H05K 1/0271 174/161 R |
| 8,409,383 | B1 * | 4/2013 | Tan | .............. B23K 20/10 156/580.1 |
| 2010/0281681 | A1 * | 11/2010 | Rourke | .............. H01M 2/206 29/623.1 |
| 2012/0107546 | A1 | 5/2012 | Schroth et al. | |

FOREIGN PATENT DOCUMENTS

| | | |
|---|---|---|
| JP | 2002-190500 A | 7/2002 |
| KR | 10-1294039 B1 | 8/2013 |

OTHER PUBLICATIONS

PCT International Search Report and Written Opinion, PCT Application No. PCT/IB2015/057752, Jan. 19, 2016, 11 pages.

* cited by examiner

*Primary Examiner* — Michael N Orlando
*Assistant Examiner* — Matthew Hoover
(74) *Attorney, Agent, or Firm* — Fenwick & West LLP

(57) ABSTRACT

A vibration isolating apparatus damps and isolates vibration generated by an ultrasonic welding machine during ultrasonic welding of components. The vibration isolating apparatus prevents vibration propagation into components and system assemblies that are not intended to be welded thereby preventing unwanted damage to the components and system assemblies.

14 Claims, 12 Drawing Sheets

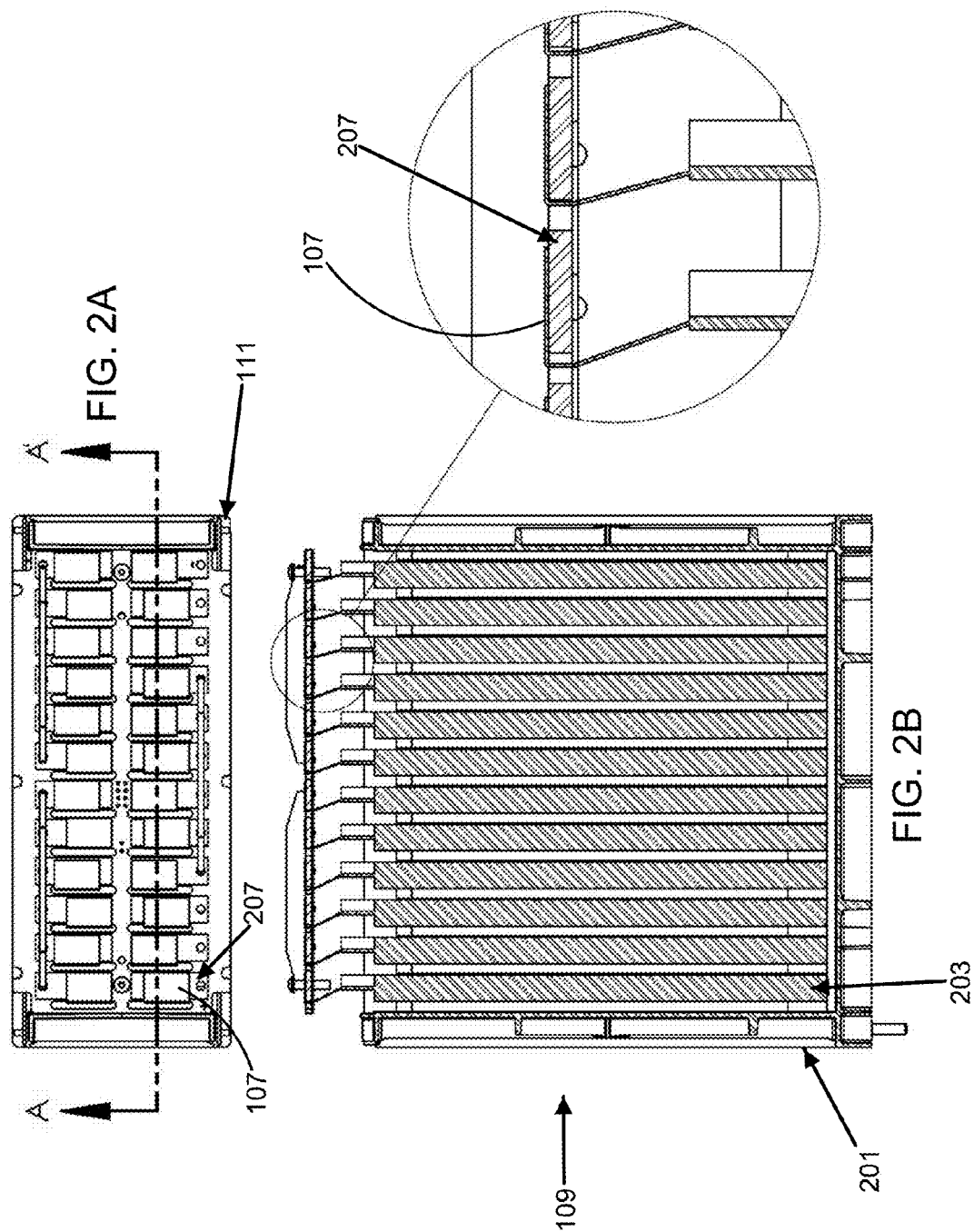

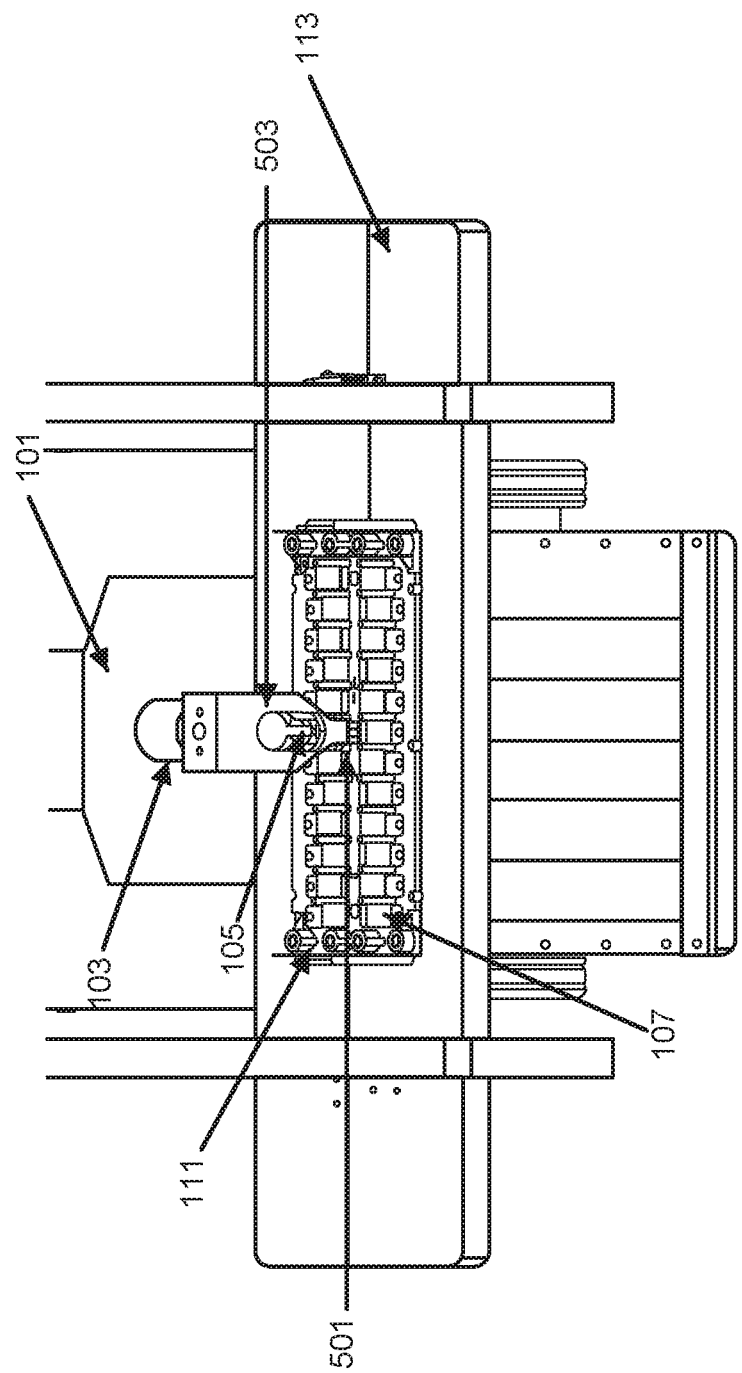

DAMPING AND ISOLATING VIBRATION DURING ULTRASONIC WELDING

CROSS-REFERENCE TO RELATED APPLICATIONS

This patent application claims the benefit of U.S. Provisional Patent Application No. 62/085,973 filed on Dec. 1, 2014, which is incorporated by reference in its entirety.

BACKGROUND

Field

The embodiments described herein relate to ultrasonic welding. Ultrasonic welding involves the delivery of vibrational energy into multiple components being held together to create a weld between the components. The vibrational energy flows into the components intended to be welded as well as other components that are not intended to be welded. The vibrational energy flowing into components that are not intended to be welded is problematic because these components may be damaged by the vibrational energy.

SUMMARY

The embodiments herein describe a vibration isolating apparatus used during ultrasonic welding of components. The vibration isolating apparatus isolates and damps vibrations generated by an ultrasonic welding machine to weld together components. By isolating and damping the vibrations, the vibration isolating apparatus prevents or at least reduces damage caused to other components as a result of being exposed to the vibrations generated by the ultrasonic welding machine.

In one embodiment, the vibration isolating apparatus includes a rigid tab plate and a damper made of a viscoelastic material. The tab plate and damper are positioned over components that require welding such as a printed circuit board. The tab plate and damper both include a plurality of cutouts that are aligned with one another when the tab plate and damper are fastened to the printed circuit board. An ultrasonic welding horn of the ultrasonic welding machine is positioned inside one of the cutouts of the tab plate and damper and presses against a component requiring welding such as a cell tab of a battery and a metal pad of the printed circuit board.

The ultrasonic welding machine generates vibrations that create a weld between the cell tab of the battery and the metal pad of the printed circuit board. Any stray vibrations that are not focused onto the cell tab and metal pad are isolated and damped by the damper to prevent other components of the printed circuit board from being damaged.

BRIEF DESCRIPTION OF THE DRAWINGS

FIG. 2A illustrates a top view of a battery assembly according to one embodiment.

FIG. 2B illustrates a side view cross-section of the battery assembly shown in FIG. 2A according to one embodiment.

FIGS. 5A and 5B illustrate various views of the ultrasonic welding system and a vibration isolating apparatus according to another embodiment.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

The embodiments herein describe a vibration isolating apparatus that damps and isolates vibration generated by an ultrasonic welding machine during ultrasonic welding of components. The vibration isolating apparatus prevents vibration propagation into components and system assemblies that are not intended to be welded thereby preventing unwanted damage to the components and system assemblies.

Ultrasonic Welding System

Figure 1:
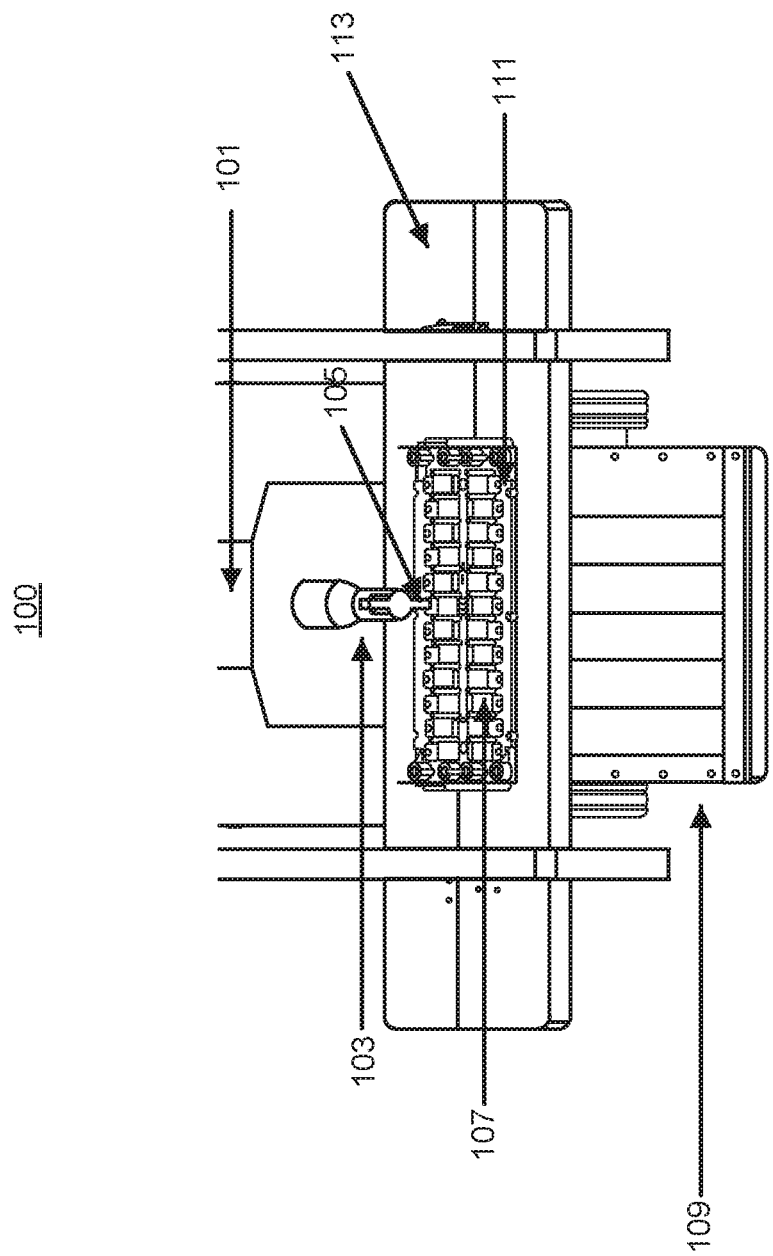
FIG. 1 illustrates an ultrasonic welding system according to one embodiment.

FIG. 1 shows a front view of an ultrasonic welding system 100. In one embodiment, the ultrasonic welding system 100 is used for ultrasonic welding of battery packs such as lithium-ion battery packs and/or any battery architecture using metallic battery cell tabs. However, the ultrasonic welding system 100 may be applied to other components that require welds between components such as a bus bar or a metal sheet.

The ultrasonic welding system 100 includes an ultrasonic welding machine 101. The ultrasonic welding machine 101 generates vibrational energy that is propagated into components to generate a weld between components. For example, the ultrasonic welding machine 101 may generate vibrations from 20 kilohertz to 40 kilohertz to weld metal components. However, other vibrational frequencies may be used. Although not shown, the ultrasonic welding machine 101 includes a power supply that converts low-frequency electricity (e.g., 50-60 Hz) to high-frequency electricity (e.g., 20-40 kHz), a converter that converts the high-frequency electricity into high-frequency vibrations (ultrasound), and a booster that amplifies the high-frequency vibrations.

The ultrasonic welding machine 101 includes an ultrasonic welding horn 103. Generally, the ultrasonic welding horn 103 supplies vibrations generated by the ultrasonic welding machine 101 to the components in contact with the ultrasonic welding horn 103 that require welding. In particular, the ultrasonic welding horn 103 includes an output tip 105 that focuses and delivers the ultrasonic vibrations generated by the ultrasonic welding machine 100 to components requiring welding.

The ultrasonic welding machine 101 positions the ultrasonic welding horn 103 such that the output tip 105 is placed in contact with components to be welded. The ultrasonic welding machine 101 applies pressure to the ultrasonic welding horn 103 to maintain contact between the output tip 105 and the components. The ultrasonic welding horn 103 supplies vibrations generated by the ultrasonic welding machine 101 to the components in contact with the output tip 105 of the ultrasonic welding horn 103. The ultrasonic vibrations delivered by the ultrasonic welding horn 103 to the components heat up the components thereby generating a weld between the components. The ultrasonic welding horn 103 may vibrate in either the up-and-down direction or the side-to-side direction.

Figure 4A:
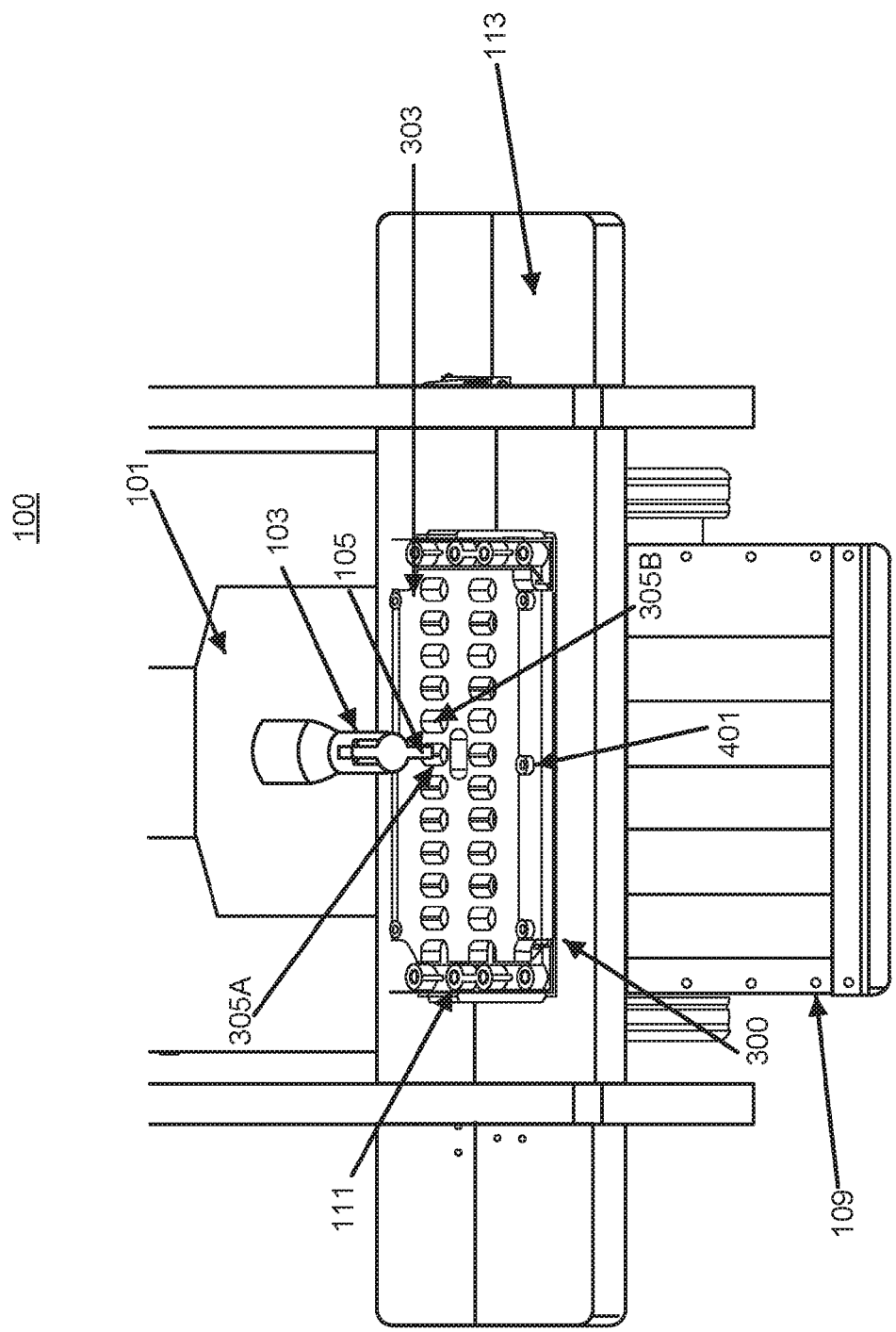
FIGS. 4A and 4B illustrate various views of the ultrasonic welding system and the vibration isolating apparatus of FIG. 3 according to one embodiment.
Figure 4B:
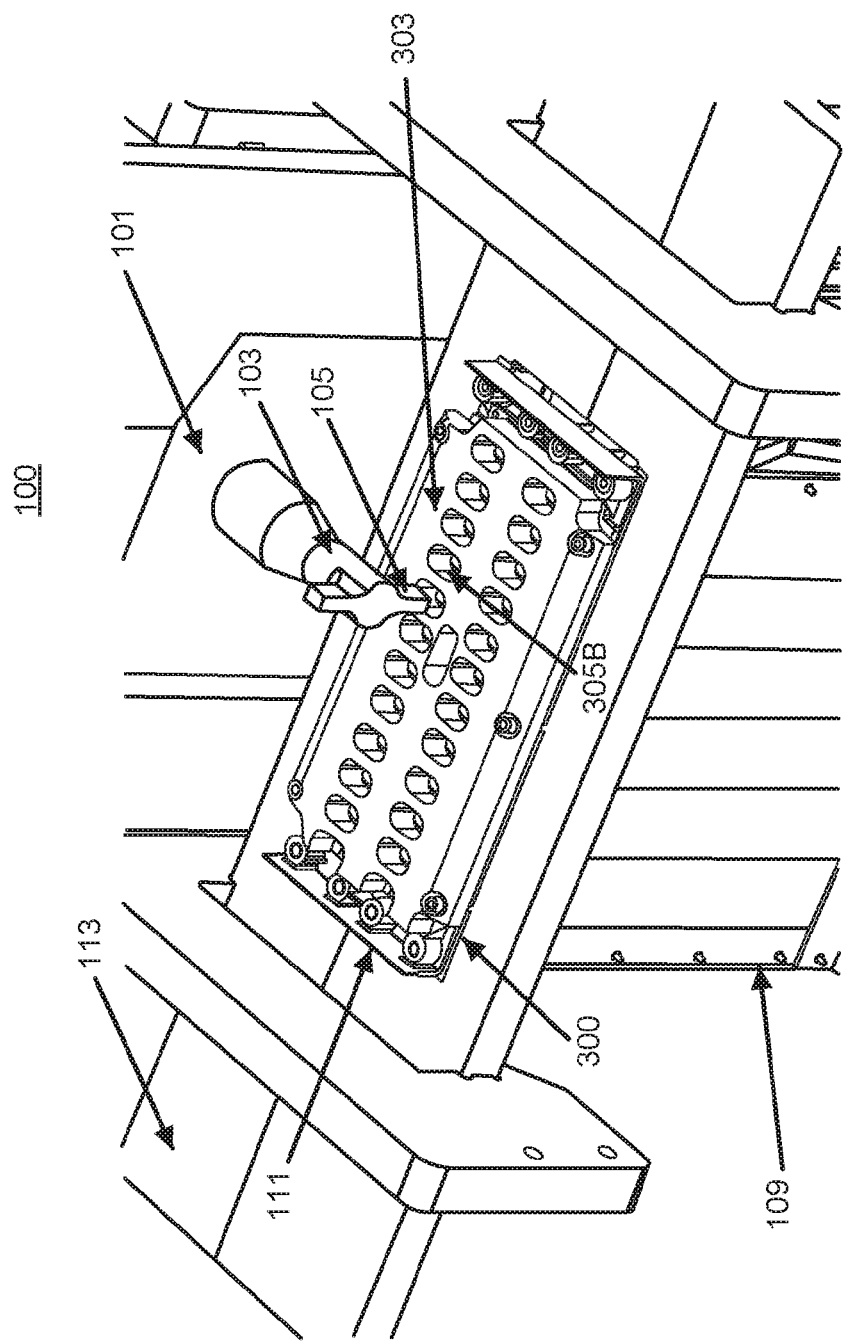

In one embodiment, the cross-section of the output tip 105 may have various shapes such as a rectangular cross-section as shown in FIGS. 1 and 4A and 4B. However, the cross-section of the output tip 105 may have other shapes such as a round cross-section or another other geometric shape. In the embodiments described herein, the ultrasonic welding horn 103 is designed specifically for metal to metal weldments. However, the ultrasonic welding horn 103 may be designed to weld other materials such as plastics.

As mentioned above, the embodiments herein describe ultrasonic welding of battery packs. FIG. 1 illustrates ultrasonic welding of cell tabs 107 of a battery pack 109 to metal pads of a printed circuit board 111 that is supported by a table 113 of the ultrasonic welding system 100 according to one embodiment. FIG. 2A illustrates a top view of the printed circuit board 111 and the battery pack 109 according to one embodiment. FIG. 2B illustrates a side view cross-section of the printed circuit board 11 and the battery pack 109 along line A-A' shown in FIG. 2A.

As shown in FIG. 2B, the battery pack 109 includes a battery frame 201. The battery frame 201 houses a plurality of battery cells 203 that are included in the battery pack 109. In one embodiment, each battery cell 203 includes positive and negative cell tabs that extend from the battery cell as shown in FIG. 2B. The cell tab 107 is configured to provide an electrical connection between a battery cell and a metal pad 207 of the printed circuit board 111 once the cell tab 107 is welded to the metal pad 207. In one embodiment, each cell tab 107 may be welded, soldered, or mechanically connected to a corresponding battery cell 203. The cell tab 107 is made of any conductive material such as metal (e.g., copper, gold, etc.)

As shown in FIG. 2B, each cell tab 107 extends from the cell 203 through an opening in the printed circuit board 111. As shown in FIGS. 2A and 2B, each cell tab 107 is bent across a corresponding metal pad 207 of the printed circuit board 111. Thus, each metal pad 207 is electrically connected to a corresponding battery cell 203 via a cell tab 107. In one embodiment, the electrical connection between each metal pad 207 and a corresponding battery cell 203 is created by welding each cell tab 107 to a corresponding metal pad 207 as will be further described below. By creating an electrical connection between each battery cell 203 and a corresponding metal pad 207 of the printed circuit board 111, the printed circuit board 111 may measure characteristics of the battery cells 203. Electrical characteristics include voltage, current, and/or temperature.

Figure 3A:
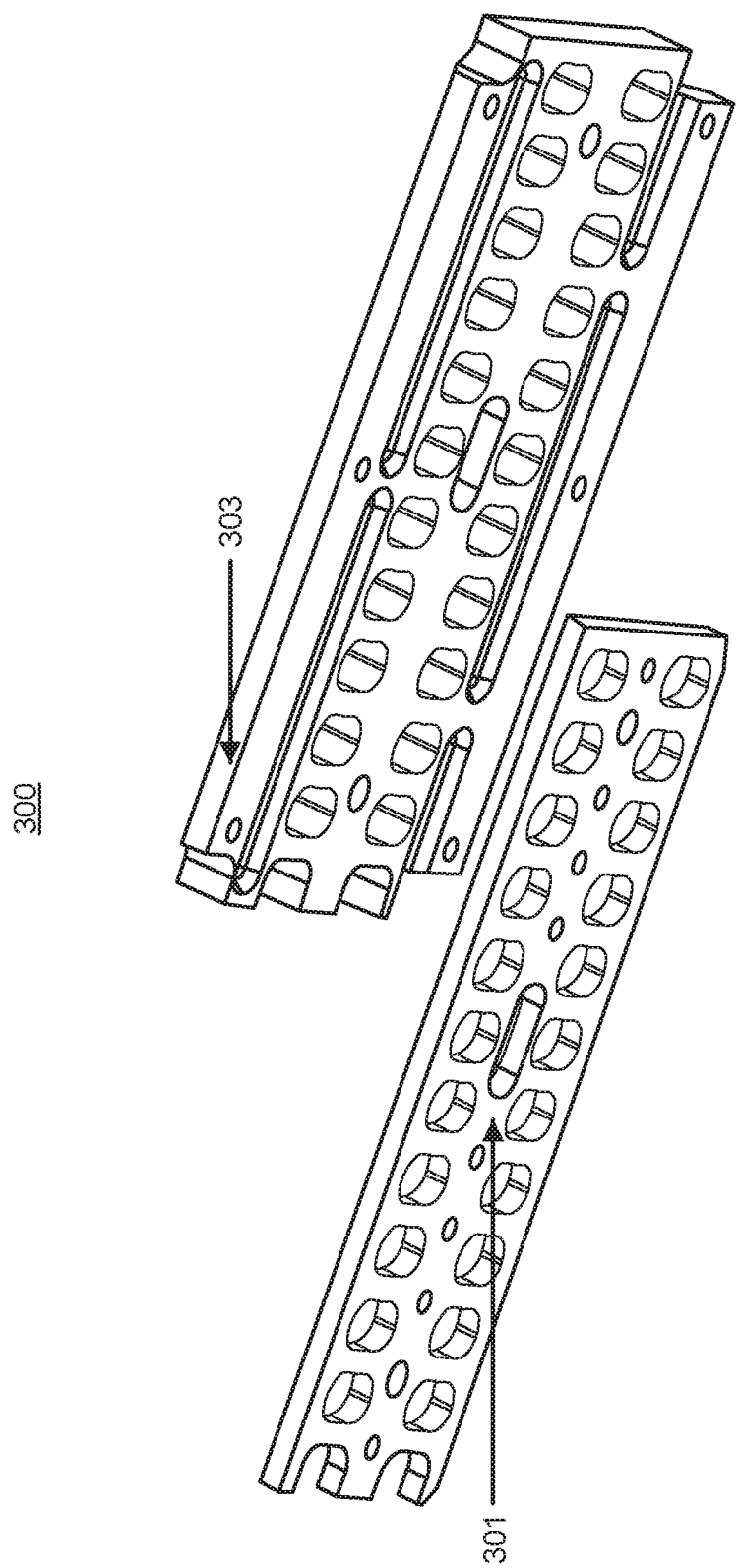
FIGS. 3A, 3B, 3C, and 3D illustrate various views of a vibration isolating apparatus according to one embodiment.

FIG. 3A illustrates a vibration isolating apparatus 300 according to one embodiment. The vibration isolating apparatus 300 includes a damper 301 and a tab plate 303. In one embodiment, the damper 301 and the tab plate 303 are coupled to one another and placed on top of the printed circuit board 111 to provide both damping and isolation of the vibrational energy emitted by the ultrasonic welding horn 103 to cell tabs 107 and metal pads 207 undergoing ultrasonic welding. The vibration isolating apparatus 300 thereby minimizes the amount of vibrational energy that enters other components of the printed circuit board 111 that are not undergoing ultrasonic welding in order to prevent or at the very least reduce any damage to the other components.

Figure 3B:
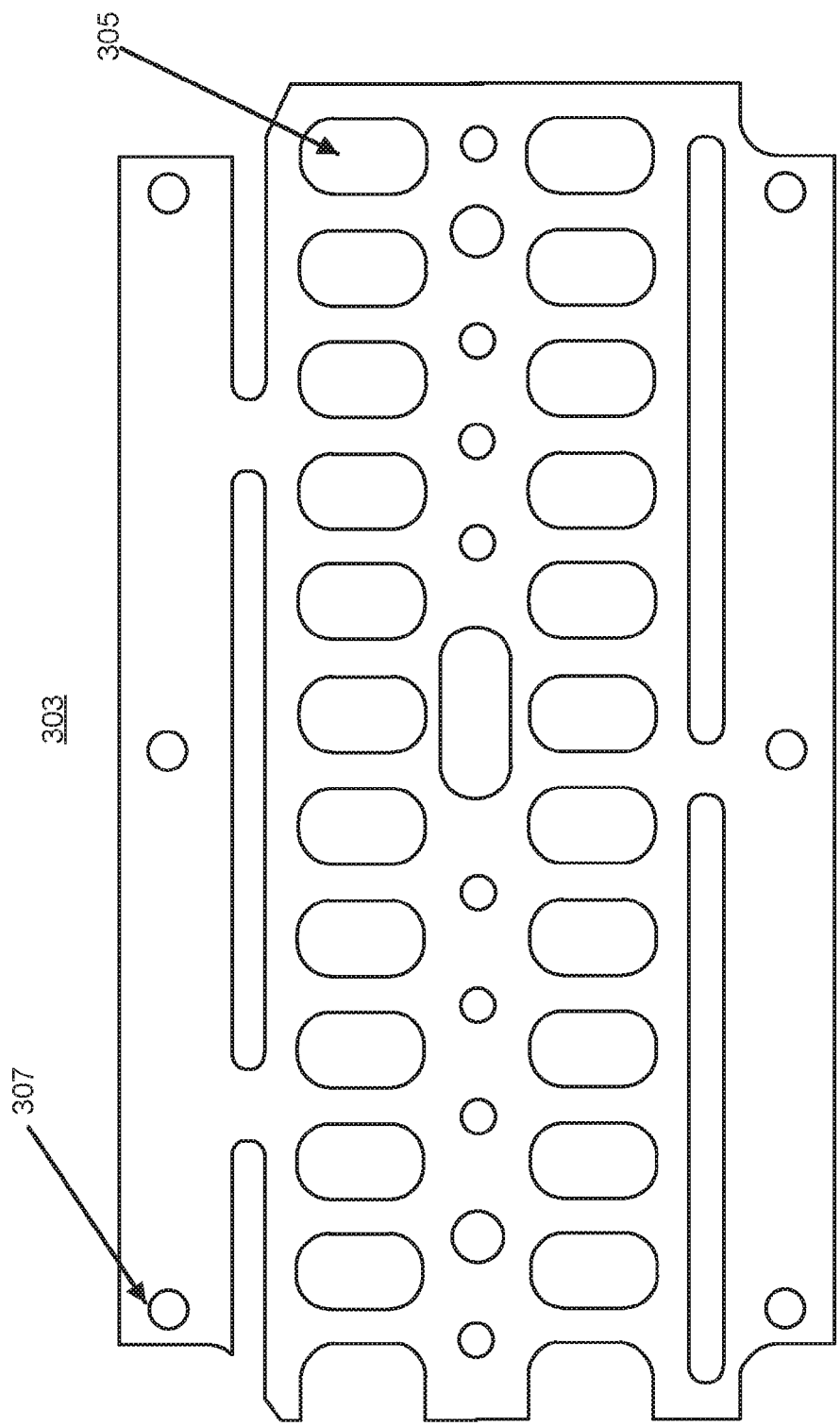

FIG. 3B is a detailed view of the tab plate 303. In one embodiment, the shape of the tab plate 303 is based on the shape of the object including components requiring welding. In the embodiments herein, the tab pate 303 is rectangular in shape because the printed circuit board 111 is rectangular in shape. However, the tab plate 303 may have any shape.

In one embodiment, the tab plate 303 includes a plurality of cutouts 305 which are holes in the tab plate 303. Generally, the position (i.e., location) of the cutouts 305 within the tab plate 303 correspond to the position of the components that require welding. For example, the position of the cutouts 305 within the tab plate 303 correspond to the position of the metal pads 207 of the printed circuit board 111. Thus, the position of each cutout 305 in the tab plate 303 corresponds to the position of a metal pad 207 included in the printed circuit board 111.

In one embodiment, the size and shape of the cutouts 305 are designed so that the output tip 105 of the ultrasonic welding horn 103 fits inside each cutout 305 without the output tip 105 contacting the tab plate 303. The size and shape of the cutouts 305 are also based on the size and shape of the components requiring welding such as the metal pads 207. The cutouts 305 are large enough so that the component requiring welding can fit inside the cutout 305 without coming into contact with the tab plate 303. As shown in FIG. 3B, the cutouts 305 are elliptical in shape. However, the cutouts 305 may be other shapes such as rectangles, circles, squares, etc.

In one embodiment, the tab plate 303 also includes mounting holes 307. Fasteners such as screws or bolts are placed through the mounting holes 307 to secure the tab plate 303 and damper 301 to the printed circuit board 111. As shown in FIG. 3B, the mounting holes 307 are located along the edges of the tab plate 303.

In one embodiment, the tab plate 303 is fabricated from a rigid, nonconductive material such as plastic. An example of a suitable plastic includes polycarbonate. The tab plate 303 may also be constructed from metal. However, if the tab plate 303 is constructed of metal, the tab plate 303 must be covered with an electrical insulator to prevent unwanted electrical connections between the components being welded and the ultrasonic welding horn 103. The tab plate 303 may be covered with an electrical insulator via a wrapping or coating process. The tab plate 303 is constructed from a rigid material as the tab plate 303 is used to compress the damper 301 as will be described below.

Figure 3C:
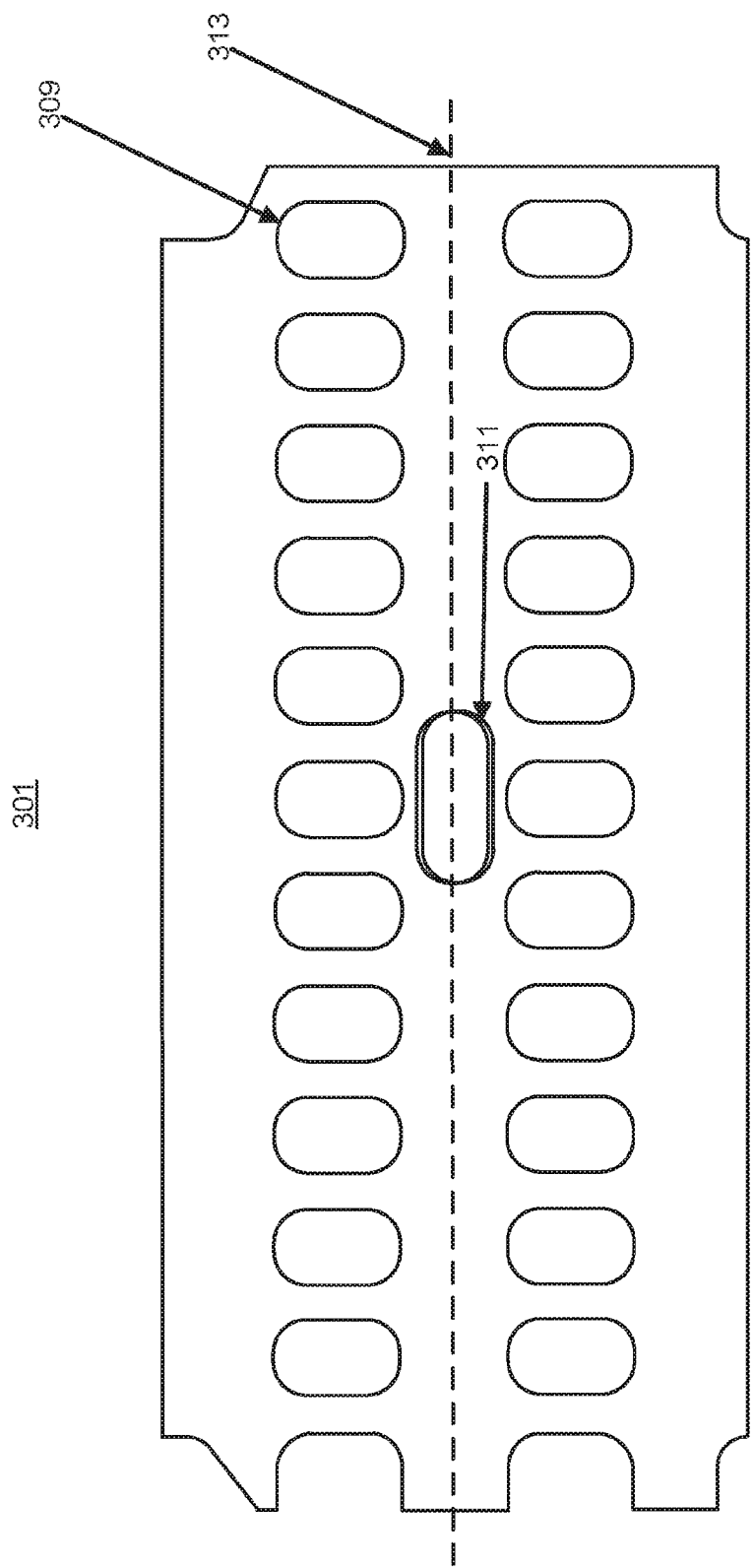

FIG. 3C is a detailed view of the damper 301 according to one embodiment. The damper 301 includes a plurality of cutouts 309 similar to the tab plate 303. The size and shape of the cutouts 309 of the damper 301 are also designed so that the output tip 105 of the ultrasonic welding horn 103 fits inside each cutout 309 of the damper 301 without the output tip 105 contacting the damper 301. As shown in FIG. 3C, the cutouts 309 are elliptical in shape, but the cutouts 309 may be other shapes such as rectangles, circles, squares, etc. In one embodiment, the size and shape of the cutouts 309 are substantially the same as the size and shape of the cutouts 305 included in the tab plate 303.

Similar to the cutouts 305 included in the tab plate 303, the position of the cutouts 309 included in the damper 301 correspond to the position of the components that require welding. For example, the position of the cutouts 309 within the damper 301 correspond to the position of the metal pads 207 in the printed circuit board 111. Since the cutouts 309 of the damper 301 are located at positions corresponding to the metal pads 207 of the printed circuit board 111, each cutout 309 of the damper 301 substantially overlaps with a corresponding one of the cutouts 305 of the tab plate 303. That is, a center of each cutout 309 of the damper 301 and a center of a corresponding cutout 305 of the tab plate 303 are aligned when the tab plate 303 is correctly positioned on top of the damper 301. Thus, when the damper 301 and the tab plate 303 are positioned on top of the printed circuit board 111, each metal pad 207 of the printed circuit board 111 is exposed via corresponding cutouts of the damper 301 and tab plate 303 as will be further described below.

In one embodiment, the damper 301 is made of a viscoelastic material. Generally, a viscoelastic material is a material that exhibits both viscous and elastic characteristics under deformation. The viscoelastic material is a material that both absorbs energy and releases energy and acts as both a damper and isolator. The viscoelastic material has a high damping coefficient and prevents and/or limits resonance from occurring. An example of a viscoelastic material is Sorbothane. Due to the damper 301 being made of a viscoelastic material, the damper 301 isolates and dampens vibrations such as the ultrasonic vibrations generated by the ultrasonic welding machine 101 during welding of a cell tab 107 and metal pad 207.

In one embodiment, the damper 301 includes one or more compression holes. Although only a single compression hole 311 is shown in FIG. 3C, the damper 301 can include multiple compression holes. The compression hole 311 is located along the centerline 313 of the damper 301. In one embodiment, the compression hole 311 provides space for the damper 301 to bulge as it is compressed by the tab plate 303. Thus, the damper 301 does not bulge into the cutouts 309 of the damper 301 when compressed by the tab plate 303 thereby preventing the output tip 105 of the ultrasonic welding horn 103 from contacting the damper 301.

Figure 3D:
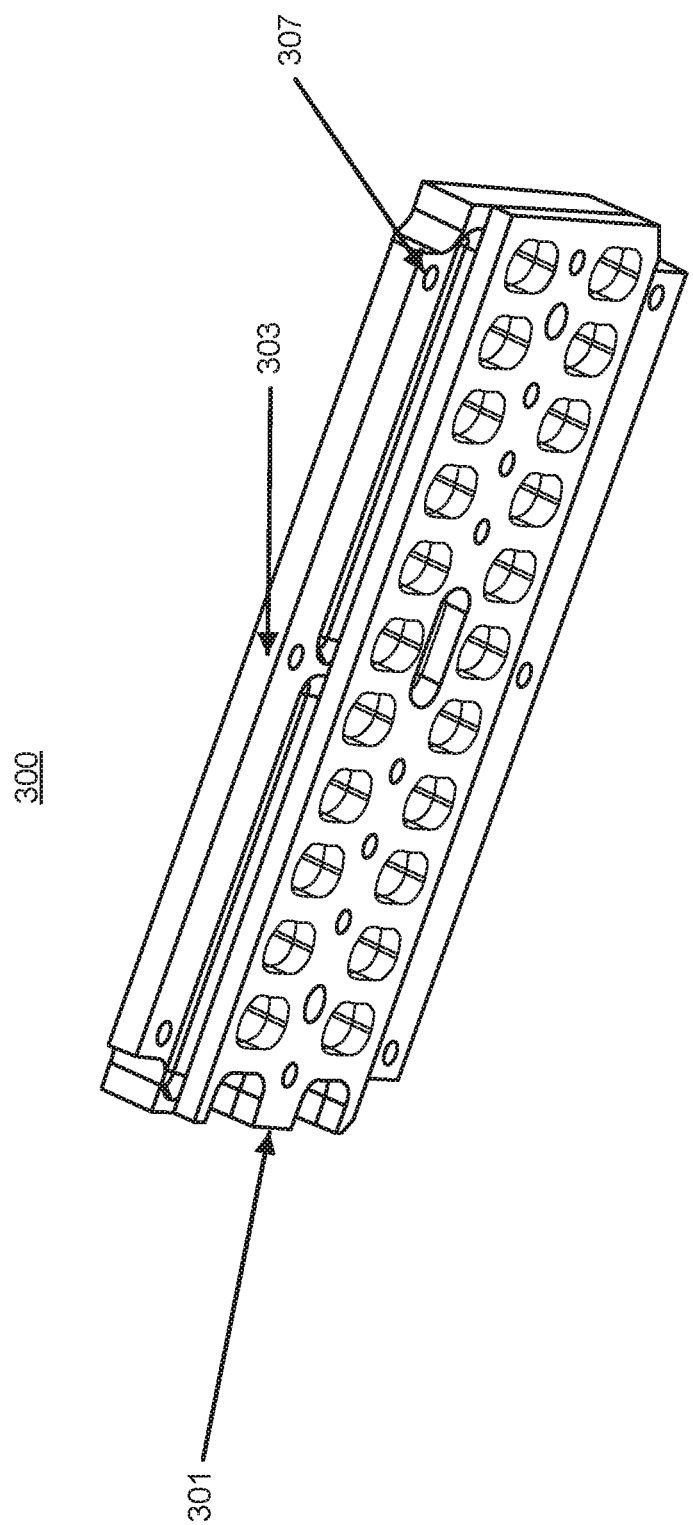

FIG. 3D is a perspective view of the vibration isolating apparatus 300 with the tab plate 303 and damper 301 attached to each other. The mounting holes 307 of the tab plate 303 are used to fasten the vibration isolating apparatus 300 to the printed circuit board 111. Since the tab plate 301 is rigid, the tab plate 303 uniformly compresses the damper 301 as the vibration isolating apparatus 300 is secured to the printed circuit board 111 using fasteners.

FIG. 4A and FIG. 4B respectively show a front view and a perspective view of the ultrasonic welding system 100 with the vibration isolating apparatus 300 according to one embodiment. The vibration isolating apparatus 300 is secured to the printed circuit board 111 via fasteners 401. During the welding process, the ultrasonic welding machine 101 welds each cell tab 107 of the battery 109 to a corresponding metal pad 207 of the printed circuit board 111 one after the other.

Although a first pair of cell tab 107 and metal pad 207 may be appropriately welded, subsequent welding of other cell tab and metal pad pairs may damage a previous created weld and cause the previous weld to fail. The vibration isolating apparatus 300 individually contains each cell tab 107 and metal pad 207 such that any relative motion caused by the ultrasonic vibration generated by the ultrasonic welding machine 101 does not damage any of the other cell tabs and metal pads that were previously welded together. Any ultrasonic vibration that fails to enter a target cell tab 107 and metal pad 207 is absorbed by the damper 301 of the vibration isolating apparatus 300 which prevents or at least limits the amount of vibration that enters other cell tabs and metal pads. Thus, the vibration isolating apparatus 300 prevents the relational vibrational energy from shearing previously welded cell tabs.

For example, FIGS. 4A and 4B illustrate the output tip 105 of the ultrasonic welding horn 103 configured to weld a first pair of cell tab and metal pad via cutout 305A. The ultrasonic welding machine 101 positions the output tip 105 inside cutout 305A of tab plate 303 shown in FIG. 4A and FIG. 4B. Although not shown because the damper 301 is positioned under the tab plate 303, the output tip 105 is also positioned inside a cutout of the damper 301 that is aligned with cutout 305A of the tab plate 303.

While the output tip 105 is positioned inside cutout 305A of the tab plate 303 and a corresponding cutout of the damper 301, the output tip 105 is in contact with a cell tab that is pressed against a metal pad of the printed circuit board 111 that are located within the cutout 305A of the tab plate 303 and a corresponding cutout of the damper 301. The ultrasonic welding machine 101 generates a vibration that is focused on the cell tab and metal tab via the output tip 105 to generate a weld between the cell tab and metal tab positioned within the cutout 305A of the tab plate 303 and the corresponding cutout of the damper 301. The damper 301 isolates and damps any vibration that does not enter the cell tab and metal pad within cutout 305A of the tab plate 303 and the corresponding cutout of the damper 301 thereby preventing the vibration from entering a cell tab and metal pad pair located inside cutout 305B for example.

Figure 5B:
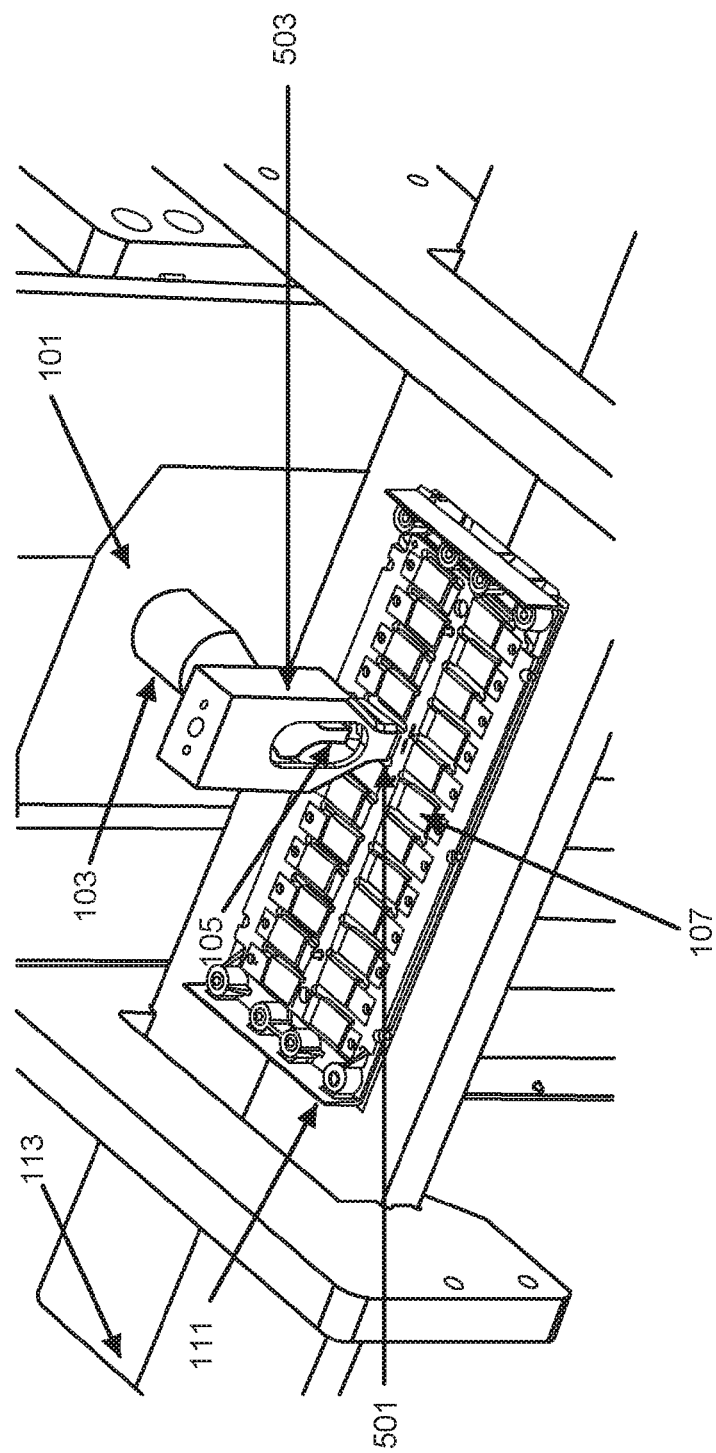

FIGS. 5A and 5B respectively show a front view and a perspective view of a vibration isolation apparatus according to another embodiment. In the embodiment shown in FIGS. 5A and 5B, the vibration isolating apparatus includes a rigid mount 503 that houses (i.e., surrounds) the ultrasonic welding horn 103. The rigid mount 503 replaces the tab plate 303 shown in the embodiment of FIGS. 3 to 4. The tip of the rigid mount 503 includes an opening having a cross section that is similar in shape to the shape of the cell tabs and metal pads. For example, the opening may be rectangular in shape but can be other shapes. The opening of the rigid mount 503 is sized to be large enough such that it can incase a cell tab and metal pad without the cell tab and metal pad coming into contact with the rigid mount 503.

Furthermore, the vibration isolating apparatus includes a damper 501. The damper 501 has a size and shape that is substantially the same as the opening of the rigid mount 503 according to one embodiment. Thus, the damper 501 is designed such that the damper 501 does not contact the ultrasonic welding horn 103. The damper 501 is attached to the opening of the rigid mount 503 rather than over the printed circuit board 111 as shown in the embodiment of FIGS. 3 to 4. Similar to damper 301, damper 501 is made of a viscoelastic material.

The ultrasonic welding machine 101 presses the output tip 105 of the ultrasonic welding horn 103 against a cell tab 107 and metal pad 207. To isolate and damp the vibrations generated by the ultrasonic welding machine 101, the rigid mount 503 is lowered such that the opening of the damper 501 incases (i.e., surrounds) the cell tab and metal tab requiring welding. In one embodiment, the vibration isolating apparatus is lowered via a lowering mechanism such as a manually operated handle, a pneumatic cylinder, a hydraulic cylinder, a linear actuator, a solenoid, etc. The mount 503 and damper 501 limit vibrations generated by the ultrasonic welding machine 101 from being transmitted outside of the region including the cell tab and metal pad being welded. That is, any stray vibrations that do not enter a cell tab and metal pad undergoing welding is isolated and damped by the damper 501 to prevent the vibrations from entering any other cell tabs and metal pads.

Methods for Ultrasonic Welding

Figure 6:
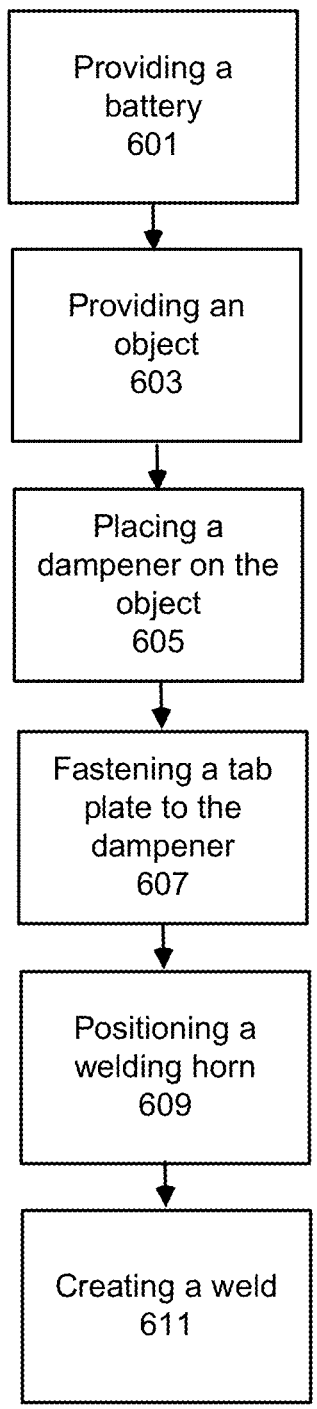
FIG. 6 illustrates a method of ultrasonic welding using the vibration isolating apparatus shown in FIGS. 3 to 4.

FIG. 6 illustrates one embodiment of a method for ultrasonic welding using the vibration isolating apparatus of the embodiment shown in FIGS. 1 through 4. Note that in other embodiments, additional steps may be included other than the steps shown in FIG. 6.

In one embodiment, the method for ultrasonic welding includes providing 601 a battery including a plurality of cell tabs and providing 603 a conductive object including a plurality of metal pads such as a circuit board. Each cell tab will be welded to a corresponding one of the plurality of metal pads.

The method further includes placing 605 a damper on the object. The damper includes a plurality of cutouts. In one embodiment, the damper may be a viscoelastic damper as described above. While the damper is placed on the object, each of the plurality of metal pads and at least a portion of each of the plurality of cell tabs are located within one of the plurality of cutouts of the damper. The tab plate is then fastened 607 to the damper thereby compressing the damper onto the circuit board. In one embodiment, the tab plate includes a plurality of cutouts that have the substantially same size and shape as the cutouts of the damper. While the tab plate is fastened to the damper, each of the cutouts of the tab plate is aligned with one of the cutouts of the damper.

The welding horn of the ultrasonic welding machine is then positioned 609 into one of the cutouts of the tab plate and one of the cutouts of the damper that is aligned with the cutout of the tab plate. A weld is then created 611 between a metal pad and a cell tab located within the cutout of the damper in which the welding horn is positioned using the welding horn.

Figure 7:
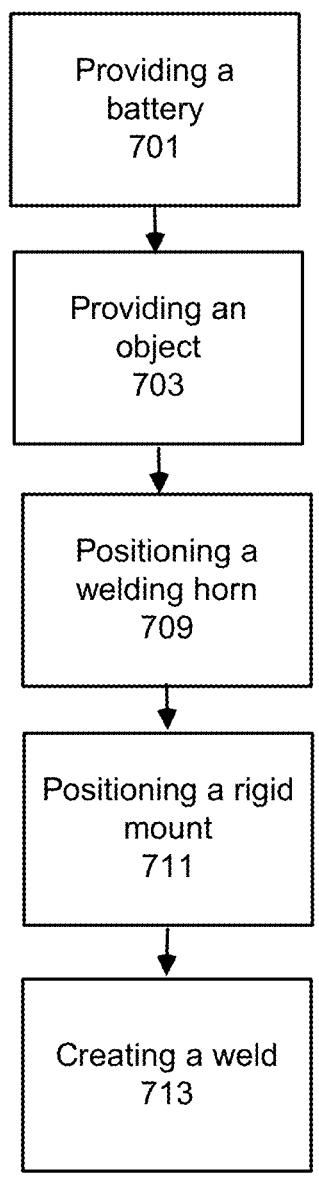
FIG. 7 illustrates a method of ultrasonic welding using the vibration isolating apparatus shown in FIG. 5.

FIG. 7 illustrates another embodiment of a method for ultrasonic welding using the vibration isolating apparatus of the embodiment shown in FIG. 5. Note that in other embodiments, additional steps may be included other than the steps shown in FIG. 7.

In one embodiment, the method for ultrasonic welding includes providing 701 a battery including a plurality of cell tabs and providing 703 an object including a plurality of metal pads such as a circuit board. Each cell tab will be welded to a corresponding one of the plurality of metal pads.

The welding horn of the ultrasonic welding machine is then positioned 709 on a cell tab of the battery and a metal pad of the object. The rigid mount is positioned 711 over the cell tab and the metal pad that is in contact with the welding horn. The rigid mount includes an opening to which a damper is attached. The damper also includes an opening and the damper may be made of a viscoelastic material as described above. While the rigid mount is positioned over the cell tab and the metal pad, the opening of the damper surrounds the cell tab and the metal pad. A weld is then created 713 between the metal pad and the cell tab located within the opening of the damper using the welding horn. Any stray vibrations that do not enter the cell tab and metal pad is isolated and damped by the damper to prevent the vibrations from entering any other cell tabs and metal pads.

Although this description has been provided in the context of specific embodiments, those of skill in the art will appreciate that many alternative embodiments may be inferred from the teaching provided. Furthermore, within this written description, the particular naming of the components, capitalization of terms, the attributes, data structures, or any other structural or programming aspect is not mandatory or significant unless otherwise noted, and the mechanisms that implement the described invention or its features may have different names, formats, or protocols. Further, some aspects of the system may be implemented via a combination of hardware and software or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. An ultrasonic welding system comprising:
    a vibration isolating apparatus including:
        a rigid plate comprising a first plurality of cutouts; and
        a damper comprising a second plurality of cutouts;
    wherein the damper is positioned on an object including a plurality of metal pads, and each of the plurality of metal pads and at least a portion of each of a plurality of cell tabs of a battery are located within one of the second plurality of cutouts of the damper while the viscoelastic damper is on the circuit board;
    wherein the rigid plate is fastened to the damper such that each of the first plurality of cutouts is aligned with one of the second plurality of cutouts while the rigid plate is fastened to the damper; and
    wherein a vibration of a welding horn of an ultrasonic welding machine creates a weld between a metal pad and a cell tab located within the one of the second plurality of cutouts.

2. The ultrasonic welding system of claim 1, wherein the damper is made of viscoelastic material.

3. The ultrasonic welding system of claim 1, wherein the first plurality of cutouts of the rigid plate have a substantially same size and shape as the second plurality of cutouts of the damper.

4. The ultrasonic welding system of claim 3, wherein the first plurality of cutouts of the rigid plate and the second plurality of cutouts of the damper are elliptical in shape.

5. The ultrasonic welding system of claim 3, wherein the size of the first plurality of cutouts of the rigid plate and the second plurality of cutouts of the damper are based on a size of the components requiring welding.

6. The ultrasonic welding system of claim 1, wherein the damper further includes one or more compression holes located along a centerline of the damper.

7. The ultrasonic welding system of claim 1, wherein the rigid plate further comprises a plurality of mounting holes located along edges of the rigid plate.

8. The ultrasonic welding system of claim 1, wherein the rigid plate is plastic.

9. The ultrasonic welding system of claim 1, wherein the rigid plate is metal and the rigid plate is covered by an electrical insulator.

10. A vibration isolating apparatus comprising:
    a rigid mount configured to attach to a ultrasonic welding horn of an ultrasonic welding machine, the rigid mount including an opening; and
    a damper including an opening, the damper coupled to the opening of the rigid mount;

wherein the opening of the damper is configured to surround a component requiring welding.

11. The vibration isolating apparatus of claim 10, wherein the damper is made of viscoelastic material.

12. The vibration isolating apparatus of claim 10, wherein the opening of the rigid mount has a substantially same shape and size as the opening of the viscoelastic damper.

13. The vibration isolating apparatus of claim 10, wherein the size of the opening of the rigid mount and the opening of the viscoelastic damper are based on a size of the component requiring welding.

14. A method comprising:
providing the ultrasonic welding system of claim 1;
creating the weld between the metal pad and the cell tab located within the one of the second plurality of cutouts.

* * * * *